April 28, 1970

J. W. BISHOP 3,508,506

PROCESS AND APPARATUS FOR REDUCTION OF
UNBURNED COMBUSTIBLE IN FLY ASH
Filed June 13, 1968

INVENTOR
JOHN W. BISHOP
BY
ATTORNEYS

United States Patent Office 3,508,506
Patented Apr. 28, 1970

3,508,506
PROCESS AND APPARATUS FOR REDUCTION OF UNBURNED COMBUSTIBLE IN FLY ASH
John W. Bishop, Alexandria, Va., assignor to the United States of America as represented by the Secretary of the Interior
Filed June 13, 1968, Ser. No. 736,626
Int. Cl. F23b 5/04
U.S. Cl. 110—165    12 Claims

ABSTRACT OF THE DISCLOSURE

Combustible content of fly ash is reduced by collecting the fly ash and introducing it into a fluidized bed burnup cell maintained at temperatures above the ignition point of combustible material in the fly ash and below its fusion point.

---

This invention resulted from work done under Contract No. 14-01-0001-478 with the Office of Coal Research of the Department of the Interior. Pursuant to the requirements of the Coal Research Act, 30 U.S.C. 666, the domestic title to the invention is in the Government.

BACKGROUND OF THE INVENTION

In the burning of coal, particularly pulverized coal, in boilers, furnaces, oxidizing fluid beds and other systems, particles of incompletely burned coal are entrained in the outgoing flue gases. These particles are composed of inert ash materials mixed with the unburned carbon residue of the coal and are referred to generically as fly ash. The combustible content of the fly ash increases the quantity of particulate material discharged from the process, thus compounding the dust collection problem and increasing the amount of air pollution resulting from the combustion process. Also, emission of unburned combustible represents an economic loss.

Generally speaking, the carbon content in fly ash increases with the rate of combustion and increases as the size of the coal particles fed to the combustion process decreases. Carbon content also tends to increase as the amount of excess air supplied to the combustion zone decreases.

Collection of carbon-containing fly ash and reinjection into the combustion zone of a furnace or boiler is an established art. In established practice, fly ash is separated from the flue gas stream in the last passes of the furnace and is reinjected into the combustion zone, preferably the hottest part of the zone, where it is again subjected to combustion conditions. U.S. Patents Nos. 2,263,433 and 2,493,960 are representative of such techniques.

However, these practices have inherent disadvantages. All fly ash which is collected is of such a particle size that it readily elutriates from the combustion zone. Since the carbonaceous material contained in such recycled fly ash has a much lower volatility than does fresh fuel introduced into the combustion zone, the fly ash is much less combustible than is the fresh fuel. As a consequence, repeated recycling of such fly ash is necessary in order to achieve a reasonable reduction of the unburned combustible material. In practice, this results in increased dust loading of the collection equipment because of the continuous re-separation and recycling of particulate matter. Furnaces, particularly those burning pulverized coal, must be designed overly-large in order to insure sufficient particle residence time for acceptable fuel burnup. A significant excess of air over that theoretically required for complete combustion is also usually provided. Use of excess combustion air increases nitrogen oxide pollution as well as significantly decreasing the thermal efficiency of the furnace.

Obviously, if a more efficient secondary system were available for completing combustion of fly ash, it would be possible to construct smaller furnaces or boilers and to tolerate a higher percentage of unburned material in the flue gases leaving the primary combustion zone. Such a secondary system would also permit operation of the primary combustion zone using less excess air and would result in less stack gas heat loss, would require lower fan power and would result in greater overall efficiency.

This invention provides a process and apparatus for reducing the combustible content of fly ash produced in the burning of ash-containing fuels such as coal. Fly ash is collected from a flue gas stream and is injected into a fluidized bed burnup cell. Use of a fluidized bed of preferably inert particles allows sufficient reaction time to nearly completely burn all combustible materials contained in the ash. Very finely divided particles of residual ash elutriate from the bed and are removed from stack gases in a conventional manner, such as by electrostatic precipitation.

Thus, it is an object of this invention to provide a process and apparatus for decreasing the combustible content of fly ash.

It is another object of this invention to increase the efficiency of existing furnaces and to decrease air pollution by more completely consuming ash-containing fuels.

DETAILED DESCRIPTION OF INVENTION

The process will be more clearly understood from the following description of preferred embodiments wherein reference is made to the accompanying drawings.

Figure 1:
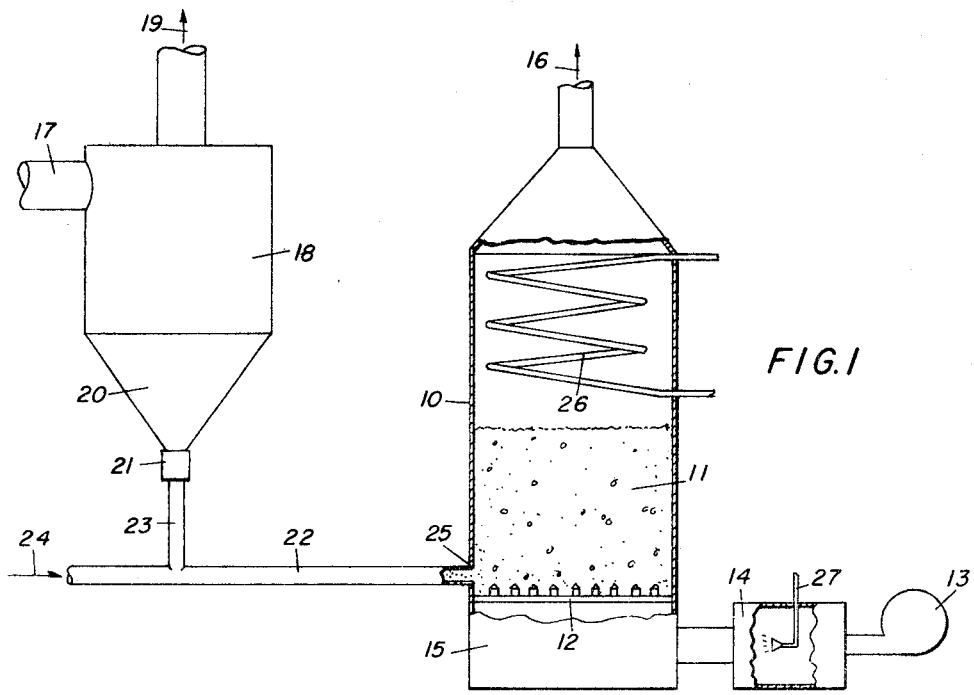
FIG. 1 is a diagrammatic representation of a general system for the recovery of combustibles from fly ash.

Referring now to FIG. 1, there is disposed within housing or combustible burning vessel 10 a mass or bed of discrete particulate material 11 of such size range that it may be readily placed in a fluidized suspension by gas flow through distribution grid 12. The particulate material 11 preferably comprises a relatively abrasion-resistant, inert mineral having a melting point at least about as high as the fusion point of the fly ash. It is preferred that particulate material making up the fluidized bed have a size significantly larger than the particle size of the collected fly ash so as to prevent elutriation losses from the bed. A size in the range of −10+40 mesh is generally satisfactory. Examples of material suitable for use in bed 11 include natural coal ashes, crushed rock, silica sands and alumina. For example, natural coal ashes having a size consist of about −8+20 mesh and a specific gravity of about 2.2 are well suited for use as a bed material. It is also possible, although not particularly advantageous, to use an oxidation catalyst as a component of the bed. Examples of such catalytic materials include activated alumina coated or impregnated with a catalytic metal such as platinum, nickel and the like.

Fluidizing and oxidizing gas, preferably air, is supplied by forced draft fan 13. The air passes through preheater 14, used only for initial ignition purposes, into plenum 15, through distribution grid 12 and exits from the fluidized bed via conduit 16.

Fly ash bearing flue gas 17 from a primary combustion zone enters dust collector 18 where fly ash particles are removed. Cleaned flue gas exits from the collector at 19 and fly ash containing significant amounts of combustible material is collected in hopper 20. Collector 19 comprises generally a zone of reduced gas velocity and preferably comprises a cyclone-type separator.

As a general rule, combustible content of fly ash is directly related to the particle size of the fly ash; the larger the fly ash particle, the greater its combustible content. Thus, the final combustible content of fly ash leaving the system is controlled by the operating efficiency of the dust collector. It is generally desirable to remove and recycle fly ash particles larger than about 325 mesh. Smaller particles, significantly reduced in combustible content, are carried from the dust collector in the cleaned gas stream from which they may be removed by secondary means such as electrostatic precipitation before release of the gas to the atmosphere.

Collected fly ash in hopper 20 is fed by any suitable means such as rotary feeder 21, into pneumatic feed tube 22 via conduit 23. Injection air 24, from any convenient external source, transports the fly ash through entry port 25 into the lower portion of fluidized bed 11.

Upon introduction of the combustible bearing fly ash into the preheated fluidized bed, ignition of the combustible content takes place almost instantaneously. Heat generated by the burning of combustibles contained in the fly ash will generally sustain the ignition temperature of the bed without additional heat input. Hot combustion gases leaving the fluidized bed may be caused to pass through any suitable convection-radiation heat exchanger 26, for the production of steam, hot fluids or hot gases. Flue gases leave burning vessel 10 via conduit 16 and may be passed directly to the stack or may be recycled back to incoming flue gas stream 17.

Generally preheater 14 is utilized only during start-up of the system. At this time, a liquid or gaseous fuel is introduced into the preheater by fuel feeding means 27. Combustion of the fuel results in raising the temperature of the fluidized bed to a level which will ignite and support the combustion of fly ash. After the fluidized bed reaches ignition temperature of the fly ash material, generally about 1400° F., fly ash is fed to the bed and fuel fed to the preheater is stopped. In those cases where the amount of combustible material contained in the fly ash feed is insufficient to sustain the ignition temperature of the bed, a supplemental coal feed may be introduced into the bed in admixture with the fly ash via feed tube 22 in order to maintain adequate bed temperatures.

Figure 2:
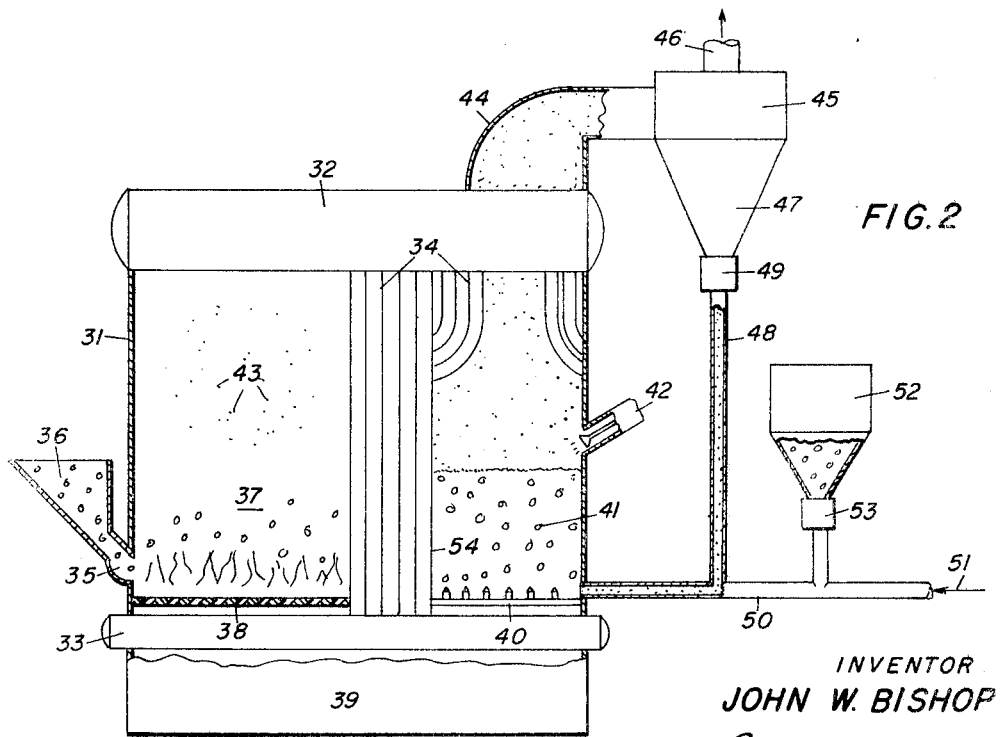
FIG. 2 represents the use of the system of FIG. 1 as an integral portion of a primary fuel burning and heat generating device.

Referring now to FIG. 2, there is shown the general system of FIG. 1 utilized as an integral adjunct of a primary combustion zone.

A boiler 31 with steam drum 32, header 33 and boiler tubes 34 is fired by a spreader stoker 35 throwing coal 36 into combustion zone 37 and onto grate 38. Primary combustion air from windbox 39 is supplied to the coal on the grate 38 and in suspension within the furnace combustion zone 37. Combustion air is also supplied from the windbox 39 to air distribution grid 40 so as to maintain the oxidizing fly ash combustible burnup bed 41 in a fluidized state. Bed 41 is as described in conjunction with FIG. 1. Preheating and start-up of the bed may be as described in FIG. 1 or may be accomplished by use of an above-the-bed burner 42 in conjunction with an initial charge of coal.

Combustible bearing fly ash particles 43 contained in flue gas from the primary combustion zone 37 pass across and around boiler tubes 34 and exit from the boiler via breeching 44. Fly ash particles are separated from the flue gas in dust collector 45. Cleaned flue gas is discharged at 46 and separated fly ash collects in hopper 47. Collected fly ash is discharged from hopper 47 into conduit 48 by means of feeding device 49 and from there it is transported by pneumatic feed tube 50 into the lower portion of the fluidized bed by means of injection air from any convenient source 51. As a means of controlling the temperature of the fluidized bed 41, small controlled amounts of stabilizing coal may be introduced from hopper 52 into the pneumatic feed tube 50 by means of feeding device 53.

In operation, the combustible-containing fly ash, optionally admixed with small amounts of coal for temperature control purposes, burns rapidly in the oxidizing fluid bed. Heat released by this combustion maintains bed temperature and delivers hot flue gases to the boiler heat absorbing tubes 34 located above the bed. Depending upon fly ash burnup section configuration and excess air requirements, a certain amount of heat is extracted from the bed by direct contact with those boiler tubes in direct contact with the bed as at 54. Fly ash particles which are reduced in combustible content exit from the top of the fluidized bed, are entrained with the combustible bearing fly ash from the primary combustion zone and then pass to the dust collector. Fine fly ash particles which pass through the dust collector have been found to be relatively free of combustible material. These small particles are collected by secondary means, such as by electrostatic precipitation, and are disposed of in a conventional manner. Larger particles which still contain significant amounts of combustible material are recollected, along with fly ash from the primary combustion zone, and are reinjected into the burnup bed for further combustible reduction.

Example 1

Crushed coal of ¼ x 0 inch size consist, containing 6% ash was burned in a primary combustion zone consisting of a fluidized boiler module, such as that disclosed in my copending application Ser. No. 624,655. Fly ash entrained in the exiting flue gas contained 70% carbon representing a 15% loss of the heating value of the coal fed. The fly ash was collected and was injected into a fluidized burnup bed such as that illustrated in FIG. 1. Fly ash from this bed was collected and was found to contain 14% carbon representing less than a 1% loss of the heating value of the original coal fed. Recycling of this recollected fly ash further reduced its carbon content.

Example 2

Fly ash from a conventional spreader-stoker fired boiler producing 30,000 lb./hr. of 600 p.s.i. steam of 825° F. and operating at 84% thermal efficiency with a 2.5% combustible loss is treated in the system illustrated in FIG. 1. Combustible loss in the fly ash is reduced by 75%. With coal priced at 35¢ per million B.t.u., this represents a fuel saving of $30,000 per year in addition to savings accuring from reduced fan power and lower flue gas heat losses.

While this invention has been illustrated using coal as a fuel, it is obvious that other solid ash-containing fuels such as petroleum coke also are satisfactory. Other forms and applications of the process and apparatus will be obvious to those skilled in the art. It is the intention, therefore, to be limited only as indicated by the scope of the following claims.

What is claimed is:

1. A process for the reduction of combustible content of particulate fly ash produced in a primary combustion zone which comprises:
   (a) passing a fly ash containing, oxygen-depleted flue gas stream from the primary combustion zone into a separation zone;
   (b) separating a major portion of particulate fly ash from said oxygen-depleted flue gas stream to produce a cleaned flue gas stream and a fly ash portion;
   (c) providing a secondary combustion zone comprising a fluidized bed of non-combustible particulate material supported upon a gas distribution grid, the fluidized bed being maintained at a temperature above the ignition temperature of combustibles contained in the separated fly ash portion;
   (d) introducing fly ash from step (b) into the secondary combustion zone at a point above the gas distribution grid, and (e) introducing a gas having a significantly greater oxygen content than that contained in the oxygen-depleted flue gas through the distribution grid to fluidize the bed and to oxidize combustible material contained in said fly ash.

2. The process of claim 1 wherein the temperature within said secondary zone is maintained above about 1400° F. and below the fusion temperature of said fly ash.

3. The process of claim 2 wherein said bed of particulate material has a melting point above the fusion point of said fly ash.

4. The process of claim 3 wherein said collected fly ash is introduced into the lower portion of said bed as a pneumatic suspension.

5. The process of claim 4 wherein small amounts of fuel are introduced into said bed thereby controlling the temperature within said bed.

6. The process of claim 5 wherein said fuel comprises coal and is introduced into said bed in admixture with said fly ash.

7. The process of claim 4 wherein said collected fly ash has a particle size larger than about 325 mesh.

8. The process of claim 7 wherein said particulate material has a particle size larger than about 40 mesh and is chosen from the group consisting of coal ash, crushed rock, silica sands and alumina.

9. A combustion apparatus comprising in combination, a first combustion chamber, means for introducing an ash-containing fuel into said chamber, means for creating an upwardly directed flow of air through said chamber, means for removing the gases of combustion from the upper portion of said chamber, a second combustion chamber adjacent said first combustion chamber, and in parallel arrangement therewith, said second chamber having grid means disposed in the lower portion thereof, said grid means being adapted to support a bed of particulate, heat resistant material and to pass a stream of fluidizing gas upwardly through said particulate bed, means to remove gases from said second chamber, means to remove entrained particulate material from the gases removed from said first and second chambers and means to introduce said removed entrained particulate material into said second combustion chamber at a point above said grid means.

10. The apparatus of claim 9 including means for introducing metered quantities of fuel into said second combustion chamber.

11. The apparatus of claim 10 wherein said means to introduce removed particulate material into said second combustion chamber comprises storage means for said particulate material, conduit means communicating with said second combustion zone and with said storage means, feeding means in said conduit means for metering particulate material from said storage means into said conduit, and inlet means for admitting air under pressure into the conduit to mix with and propel particulate material through the conduit and into said second combustion chamber.

12. The apparatus of claim 11 wherein said first combustion chamber and said second combustion chamber are separated by means of a common partition wall, said wall comprising heat transfer means adapted to absorb and remove heat produced by combustion reactions within said chambers.

References Cited

UNITED STATES PATENTS

| | | | |
|---|---|---|---|
| 3,080,855 | 3/1963 | Lewis | 122—4 |
| 3,431,892 | 3/1969 | Godel | 122—4 |

FOREIGN PATENTS

| | | |
|---|---|---|
| 838,208 | 6/1960 | Great Britain. |

KENNETH W. SPRAGUE, Primary Examiner

U.S. Cl. X.R.

122—4